United States Patent [19]
Veltman

[11] 3,915,822
[45] Oct. 28, 1975

[54] ELECTROCHEMICAL SYSTEM WITH BED SECTIONS HAVING VARIABLE GRADIENT

[75] Inventor: Preston Leonard Veltman, Severna Park, Md.

[73] Assignee: W. R. Grace & Co., New York, N.Y.

[22] Filed: May 22, 1974

[21] Appl. No.: 472,426

[52] U.S. Cl. ............... 204/151; 204/130; 204/149; 204/257
[51] Int. Cl.² .... C02B 1/82; C02C 5/12; B01K 3/04
[58] Field of Search .......... 204/149, 152, 151, 130, 204/268, 254, 255, 257, 301

[56] References Cited
UNITED STATES PATENTS

| | | | |
|---|---|---|---|
| 756,328 | 4/1904 | Christy | 204/284 X |
| 840,511 | 1/1907 | Packard | 204/130 |
| 883,170 | 3/1908 | Christy | 204/291 X |
| 1,312,756 | 8/1919 | Stover | 204/268 |
| 2,563,903 | 8/1951 | Zadra | 204/109 X |
| 3,515,664 | 6/1970 | Johnson et al. | 204/301 |

Primary Examiner—John H. Mack
Assistant Examiner—A. C. Prescott
Attorney, Agent, or Firm—L. G. Wise

[57] ABSTRACT

Processes and apparatus for electrochemical reactions including an electrochemical system in which an electrolyte is treated in a reaction zone containing at least one bed of electrically conductive particles, the improvement includes a reactor for contacting electrolyte with plural transverse electrodes in the reaction zone. The electrodes define separate adjacent electrochemical sections in the reaction zone. Each of the electrodes is biased anodically or cathodically to provide an electrochemical potential between alternating electrodes, and the system establishes different voltage gradients across adjacent sections of the reaction zone. Electrolyte can be circulated through the sections serially in a direction parallel to the voltage gradients of each section to obtain homogeneous treatment. One or more foraminous insulating diaphragms may be disposed in the reaction zone between anodic and cathodic electrodes.

The system is useful for pollution control, electrochemical synthesis and metal recovery.

48 Claims, 9 Drawing Figures

ELECTROCHEMICAL SYSTEM WITH BED SECTIONS HAVING VARIABLE GRADIENT

BACKGROUND OF THE INVENTION

The present invention relates to electrochemical processes and reactors, and more specifically to electrochemical reactions conducted in a series of particulate electrode bed sections.

It is generally known that many electrochemical reactions may be conducted rapidly and efficiently in particulate bed zones. Economic recovery of metal ions from dilute aqueous solution may be achieved by the use of particulate carbon in the reaction zone between primary electrodes.

Electrolysis cells utilizing particulate carbon electrodes are known which comprise a tank having particulate carbon and spaced primary electrodes in contact with the carbon or insulated by a diaphragm or screen. An aqueous electrolyte solution is passed through the carbon bed and an electrochemical reaction occurs in the bed, which may function anodically or cathodically.

Typical prior art electrolysis cells employing carbon bed reaction zones are disclosed in U.S. Pat. Nos. 3,616,356, 3,679,565, 3,716,459, 3,719,570, 3,730,885 and 3,764,499, incorporated herein by reference. Primary emphasis is placed on the use of carbon, usually graphite, as a porous bed material; however, it is understood by those skilled in the art that other electrically conductive or semiconductive particles can be utilized depending upon the desired use of the cell. In U.S. Pat. Nos. 3,728,238 and 3,730,864, various metals, compounds and other materials are disclosed which are useful in the present invention. The use of graphite particles mixed with insulating glass beads is suggested in U.S. Pat. No. 3,761,383.

While conventional single bed reaction devices are useful in instances where relatively small quantities of dilute electrolyte are treated, it is frequently found that these prior art cells are not capable of handling large quantities of waste solutions encountered in industrial processes.

SUMMARY OF THE INVENTION

Novel apparatus and processes have been found in an electrochemical system wherein an electrolyte is treated in a reaction zone containing at least one bed of electrically conductive particles. The improvement comprises a plurality of electrodes for contacting electrolyte in the reaction zone, with the electrodes defining discrete adjacent electrochemical sections in the reaction zone.

Means are provided for biasing each of the electrodes anodically or cathodically to maintain an electrochemical potential between alternating electrodes and for establishing different voltage gradients across adjacent sections of the reaction zone. A fluid handling system is provided for circulating electrolyte through the cell in a direction substantially parallel to the voltage gradients of each section.

Accordingly an object of the present invention is to provide an improved electrochemical reactor and operating process, including a particulate bed which is capable of handling large quantities of dilute electrolytic solutions. The process and apparatus can achieve a substantially homogeneous treatment of electrolyte by flowing the electrolyte through the particulate bed in a direction between major electrode surface areas whereby substantially all of the electrolyte undergoes uniform treatment by passing through both anodic and cathodic zones.

Another object of the invention is to provide compact electrochemical reactors having low construction cost, thereby saving space and equipment expense. By conducting electrochemical treatments in adjacent bed sections in an integrally constructed cell, multiple reactions can be achieved economically.

It is further object to provide a high throughput capacity particulate bed reactor which is particularly effective for the recovery of metal, such as Au, Cu, Ag, from dilute aqueous solutions containing metal ions.

These and other objects and features of the invention will become apparent to one skilled in the art from the following detailed description and drawing.

DESCRIPTION OF THE PREFERRED EMBODIMENTS

In the following description, various representative examples of the invention are set forth to enable one skilled in the electrochemical arts to practice the invention. Unless otherwise stated, metric units are employed throughout and proportions are given on a weight basis.

The present invention comprises an integral electrochemical cell having at least three primary electrodes spaced apart to form separate electrochemical reaction zone sections having electrically conductive discrete particles contained in the reaction zone sections.

Means are provided for maintaining electrolyte in the reaction zone sections and for applying electrical potential between electrodes while maintaining at least two different voltage gradients in the electrochemical cell.

Figure 1:
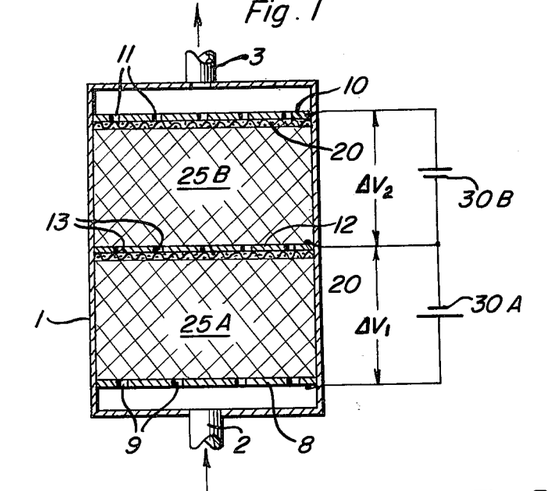
FIG. 1 is a vertical cross-sectional view of an electrochemical reactor according to the present invention.

A detailed understanding of the invention may be gained by reference to the drawing. FIG. 1 shows a reactor 1 having fluid inlet conduit conduit 2 and outlet conduit 3. At the bottom of the reaction chamber 1 a foraminous electrode 8 is located which is provided with holes or perforations 9. At the top of the reaction chamber 1 is located a second foraminous electrode 10 provided with perforations 11. An auxiliary electrode 12 having perforations 13 is mounted between the end electrodes 8, 10. The bottom electrode 8 may be biased anodically or cathodically as desired by connecting it to the positive or negative side of a DC power supply 30A through conductor 14.

At the top of reaction chamber 1, the upper foraminous electrode 10 is biased anodically or cathodically by connecting it to the source of DC potential 30B through conductor 15. Foraminous electrode 12 is connected to both power supplies 30A and 30B through conductor 16.

Within reaction chamber 1 are mounted a plurality of diaphragms or foraminous spacer insulators 20. In the particular device shown in FIG. 1 there are two screen-type insulating separators 20, each of which are provided with uniformly distributed small openings to permit fluid flow while preventing ohmic contact. The primary electrodes and insulating spacers 20 are mounted transverse to the flow of electrolyte, defining two particulate bed sections 25A and 25B. Within these packed bed spaces electrically conductive particulate material is supported by the electrode structures and vessel 1.

In operation of the cell an electrolyte to be treated enters the chamber 1 through the inlet conduit means 2. The electrolyte solutions flows upwardly past electrode 8 through perforations 9. The electrolyte solution then contacts the electrically conducting bed particulate material 25A held in fixed bed position within the lower bed space. After passing through the first foraminous separator 20 and through the holes 13 in auxiliary electrode 12. The electrolyte solution then contacts the second bed section 25A and second spacer 20 before contacting electrode 10. The electrolyte solution passes through outlet conduit means 3.

When electrolyte solution is passing through the device, a first electrical potential ($\Delta V_1$) is imposed between conductors 13 and 16 creating a first voltage gradient ($V_1$/cm) between electrodes 8 and 12 equal to the voltage divided by the interelectrode distance ($d$). A second potential is imposed between conductor 15 and 16, creating a second voltage gradient ($V_2$/cm) between electrodes 10 and 12 which gradient is substantially higher or lower than the first gradient.

Where insulating spacers are employed, there is no direct ohmic contact between bed sections; however, the particles within each section are in solid/liquid/solid contact with adjacent particles. Electrical continuity between beds is maintained by the ionic paths through the electrolyte which is a substantially continuous liquid phase throughout the beds through interstitial voids between electrically conducting particles, foraminous separating insulators and electrodes. It is found that by maintaining this condition each bed space is capable of producing a desired anodic, cathodic or bipolar effect. The reaction occurring within each bed can be either primarily electropositive, electronegative or both, as desired.

Typical materials of construction for the reaction chamber 1 include conductive and non-conductive material. Where metal such as steel is used, a nonconductive lining may be provided to prevent short circuiting of electrodes through the outer shell of the chamber 1. Other materials of construction for vessel 1 include plastic, ceramic, rubber, etc. The electrodes may be constructed of inert conductive material such as sintered, perforated or woven metal, drilled carbon, conductive fibers or cloth. For example, electrodes 8 and 10 may be stainless steel, copper, platinum, or nonmetallic conductor such as formed carbon.

Foraminous insulators 20 may be provided with a series of openings or perforations which are sufficiently large to provide flow of fluids therethrough. Means should be provided to prevent passage of the electrically conducting particulate material, which in the embodiment of FIG. 1 provides a fixed or restrained bed. Insulators may be construced of any nonconductive material such as porcelain, glass or plastic.

The primary function of the insulating spacers is to prevent direct contact between conductive particles and electrodes or between adjacent bed sections, thereby avoiding ohmic conduction through the reaction zone. Openings in the spacer permit ionic paths and substantial electrolyte flow from section to section. The insulating separator means may have fluid openings of about 50 to 1000$\mu$, and those materials having at least 50 percent open area conducive to fluid flow are preferred. The size of the openings depends upon the particle size of the bed packing material, and sufficiently small openings prevent movement of bed particles from one section to another, thereby prevenitng ohmic contact. The spacers may be rigid and mounted to support part or all of the bed weight. For instance, spacers can be bonded or otherwise fixed to the shell of the reactor chamber. Likewise, a thin flexible screen or diaphragm cut to the cross-sectional configuration of the reactor cell can provide the insulating and fluid flow functions without becoming a structural support part of the apparatus. Materials suitable for the insulating spacer include dielectric organic polymers, rubber, silicones, reinforced glass fiber, insulated conductors, coarse glass frit and other suitable electrically insulating solids in woven, fused, cast or formed construction. Polyolefins, polyacrylates, polyvinyl chloride, nylon, polytetrafluoroethylene, polyesters and phenolic resins are suitable insulating materials which are usually inert to the electrochemical reaction conditions in the cell. Ordinary plastic window screen can be easily cut to the desired shape and used in single layer or multiple layers for the spacer elements.

Thickness of the bed sections can be determined for the particular electrochemical use. Several factors can influence the choice of bed thickness, including particle size, bed porosity, reaction kinetics, particle material, electrolyte flow rate and other operating conditions. The optimum bed section thickness and total cell size can be determined routinely without extensive experimentation. Ordinarily bed section thickness of about 1–10 cm is satisfactory. In several embodiments shown, the bed sections are evenly spaced with uniform separators between beds. In order to minimize the cell size, the separators and electrodes should take up a relatively small fraction of the cell volume. In the preferred embodiments of this invention, the bed packing materials occupy more than 90 percent of the effective cell chamber volume between primary electrodes. The number of sections may be fairly large; however, most cells can employ 2 to 20 sections between primary electrodes.

The electrolyte is treated in a suitable electrolytic cell which contains a bed of particles distributed in the electrolytic reaction zone of the cell, such that the superficial or macro porosity of the bed ranges from about 10 to 50 percent, preferably about 30–35 percent.

The preferred packing material is graphite in pellet or granular form. Activated carbon in granular, spherical or other form is desirable for many electrolytic or electrosorptive processes. A preferred particulate material consists of extruded graphite in pellet form about 2 mm in diameter and 5–10 mm in length. An average particle size from about $50\mu$ to $10,000\mu$ is preferred, with those particles larger than one-half mm being optimum. The beds can be homogeneous or different materials may be used in different bed arranged serially. Other particles employed to form the porous bed in the present process are solid, particulate materials that may be conductive, non-conductive or semi-conductive. The material of which the particles are made will normally be considered ohmic-conducting material. Where the particles are conductive, they may have a metallic surface, either by virtue of the particles themselves being metallic or by being made of non-conductive material on which a metallic surface has been deposited. Typical of the metals which may be employed are platinum, copper, silver, and the like. Additionally, the conductive particles may be electrically conductive metal compounds, such as ferrophosphorus, the carbides, borides or nitrides of various metals such as silicon, tantalum, titanium and zirconium, or they may be various electrically conductive metal oxides, such as lead dioxide, ruthenium dioxide and the like. Various semi-conductive materials of which the particles may be made are fly ash, carbon (C), Si, SiC, zirconia, alumina, conductive glasses and the like. Mixtures of the above materials with one another or with insulating particles may be used.

Deposition of mercury from aqueous solution provides a coated electrically conductive particle (for instance, Hg-coated solid carbon pellets). These particles may be employed for electrochemical amalgmation of metals, especially gold.

Elongated conductive particles having magnetic orientation may be aligned in the cell by means of a magnetic field. Iron, ferro magnetic alloy, ferrite or carbon coated elements may be aligned for efficient bipolar function in this manner. Permanently magnetic particles may be prepared according to the procedure of U.S. Pat. Nos. 2,970,098 or 2,479,930, incorporated herein by reference.

A portion of the reaction zone may contain chemically active particles, such as disclosed in U.S. Pat. No. 3,766,034 incorporated herein by reference. Electromotively active metal core materials (Al, Zn, etc.) may be coated with a thin continuous layer of ion-permeable hydrophilic polymer as disclosed in U.S. Pat. No. 3,551,362, incorporated herein by reference.

Electrolyte flow rate can be varied widely. A meaningful criterion for throughput of treated electrolyte is the volumetric ratio of electrolyte per unit volume of the electrochemical reaction zone. In a packed cell with homogeneous flow, successful electrochemical reactions can be carried to substantial completion in a single pass at flow rates greater than 100 ml/liter-minute. In a static bed the flow rate and residence time are adjusted to the particular electrochemical processes, and the electrolyte flow may be maintained in the laminar regime; however, turbulent flow is desirable for some uses. Ordinarily, means is provided for flowing electrolyte at a linear velocity of about 0.1 to 100 cm/sec., preferrably about 1 to 10 cm/sec; however, linear velocities of 0.01 to over 100 cm/sec. are feasible.

In order to conserve space and obtain complete treatment of electrolyte, care may be taken in design of the electrochemical cell to maintain homogeneous flow conditions between the major opposing electrode surfaces.

The voltage impressed across the cell sections will depend upon the inter-electrode distance and the nature of the reaction being conducted. Typically it is found that a DC potential gradient on the order of about 0.1 to 10 volts/cm is used. The means for applying a DC potential to establish different voltage gradients in discrete sections of the reaction zone can employ a variety of voltage sources. The cell voltage is that value which is measured between the major electrodes. The total voltage includes any external ohmic resistance drop (IR losses) which may occur in the circuit. A single power supply may be used to apply different voltages to adjacent cell sections by utilizing external resistance in one or more circuit loops. By inserting a resistance in one of two identical cell section circuit loops connected to a common power supply, the inter-electrode voltage can be decreased to obtain a lower voltage gradient as compared to an unmodified loop.

Current densities (based on total cross-sectional area of the reaction zone) of about 0.1 to 100 ma/cm$^2$, with corresponding oxidation zone c.d about 2–10 times that of the cathodic section.

Liquid flow paths in most embodiments have a net direction essentially parallel to the voltage gradients between primary and auxiliary electrodes. To achieve this object, the use of foraminous major electrodes permits electrolyte to be introduced to the reaction zone in a direction which is essentially perpendicular to the major electrode surfaces. Liquid flow is thereby maintained essentially unidirectional and parallel to the voltage gradient through the reaction zone. Cell configuration may be adapted according to well known electrochemical standards. While the cylindrical cross-section of the cell, as shown in FIG. 1, is easily constructed and maintained, rectangular cells or other similar shapes may be used within the inventive concept.

Figure 2:
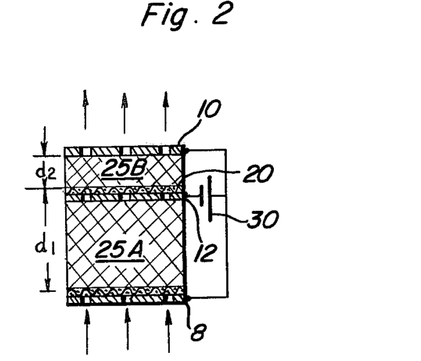
FIGS. 2 and 3 are schematic cross-sectional representations of various modifications of the reactor.

An alternative embodiment of the invention is shown in FIG. 2 of the drawing, which is a vertical cross-section view in schematic form. Electrodes 8 and 10 are disposed in opposing positions in the electrochemical reaction zone with intermediate electrode 12 spaced from electrode 8 a fixed distance $d_1$ and from electrode 10 a distance $d_2$, where $d_1 > d_2$. Power supply means is provided for applying an electrical potential between to establish different voltage gradients across the cell. Equal voltages may be used across the sections. Porous bed sections 25A, 25B within the reaction zone may be separated by at least one insulating foraminous separator means, such as planar screen 20, which may be made of polypropylene or other polymeric material. The screen separators are disposed in the reaction zone transverse to the path of electrolyte flow, indicated by arrows. The electrodes are perforated or foraminous to permit flow of electrolyte through the electrodes and reaction zone in a relatively staight fluid path. The insulating diaphragms 20 shown adjacent to major electrodes in FIG. 2 are optional; however, the use of such elements render the reaction zones more cathodic or anodic, as desired.

Figure 3:
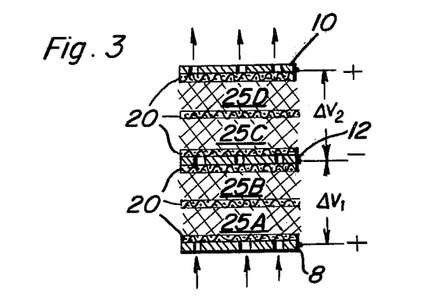

A further modification of the stacked electrochemical cell is shown schematically in FIG. 3, wherein a stack of separate porous beds 25A, 25B, 25C, 25D, each of which contains electrically conductive particles, is separated mechanically by a plurality of insulating layers 20. The separators 20 are disposed in the stack between beds in a manner which prevents direct contact between the beds electrically while permitting fluid flow between beds. Electrodes 8 and 10 are placed at opposite ends of the stack equally spaced from auxiliary electrode 12 with applied potential $\Delta V_2 > \Delta V_1$ or $\Delta V_1 > \Delta V_2$. Means are provided for flowing electrolyte upwardly through the stack serially in contact with the electrodes. The plurality of beds and insulating layers is maintained in fixed position in fluid communication with one another.

Spacing of a large number of alternating positive and negative electrodes throughout a very long column with plural bed sections having different voltages between the individual electrodes is feasible. Voltage requirements of the cell can be decreased by use of extra auxiliary electrodes without increasing the overall power requirements of the plural or compound cells. This is within the inventive concept, provided a sufficient number of bed sections are present to permit operation of a compound cell wherein each electrode set has a bed section and preferrably at least one insulating separator between major electrode surfaces.

Figure 4:
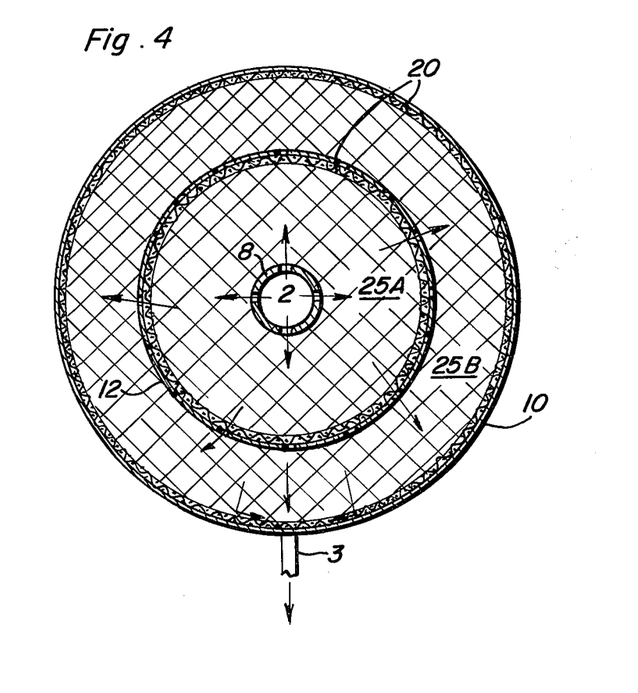
FIG. 4 is a horizontal cross-sectional view of an alternative radial flow embodiment of the invention.

An alternative electrochemical cell is shown in crossection in FIG. 4. A concentric shell electrode 10 is separated from outer porous bed section 25B by an insulator screen 20. A perforated metal pipe 8 delivers electrolyte from inlet 2 for radial flow outwardly through an inner porous bed section 25A, past insulating separator screen 20 and perforated auxiliary electrode 12 and outer porous bed section 25B. The treated electrolyte is removed from the cell by outlet conduit 3 connected to receive the flow through the outer screen adjacent electrode 10. Electrolyte flow radially along lines parallel to the electrical gradient from pipe electrode 8 to outer electrode 10. The cell of FIG. 4 may be constructed in cylindrical form with the length varied to meet design requirements. Additional cell segments may be connected end-to-end or in parallel feed arrangement. Gas may be vented from the cell by providing a top vent port (not shown) where the cell is mounted vertically with respect to the cylindrical axis.

Figures 5, 6, 8, 9:
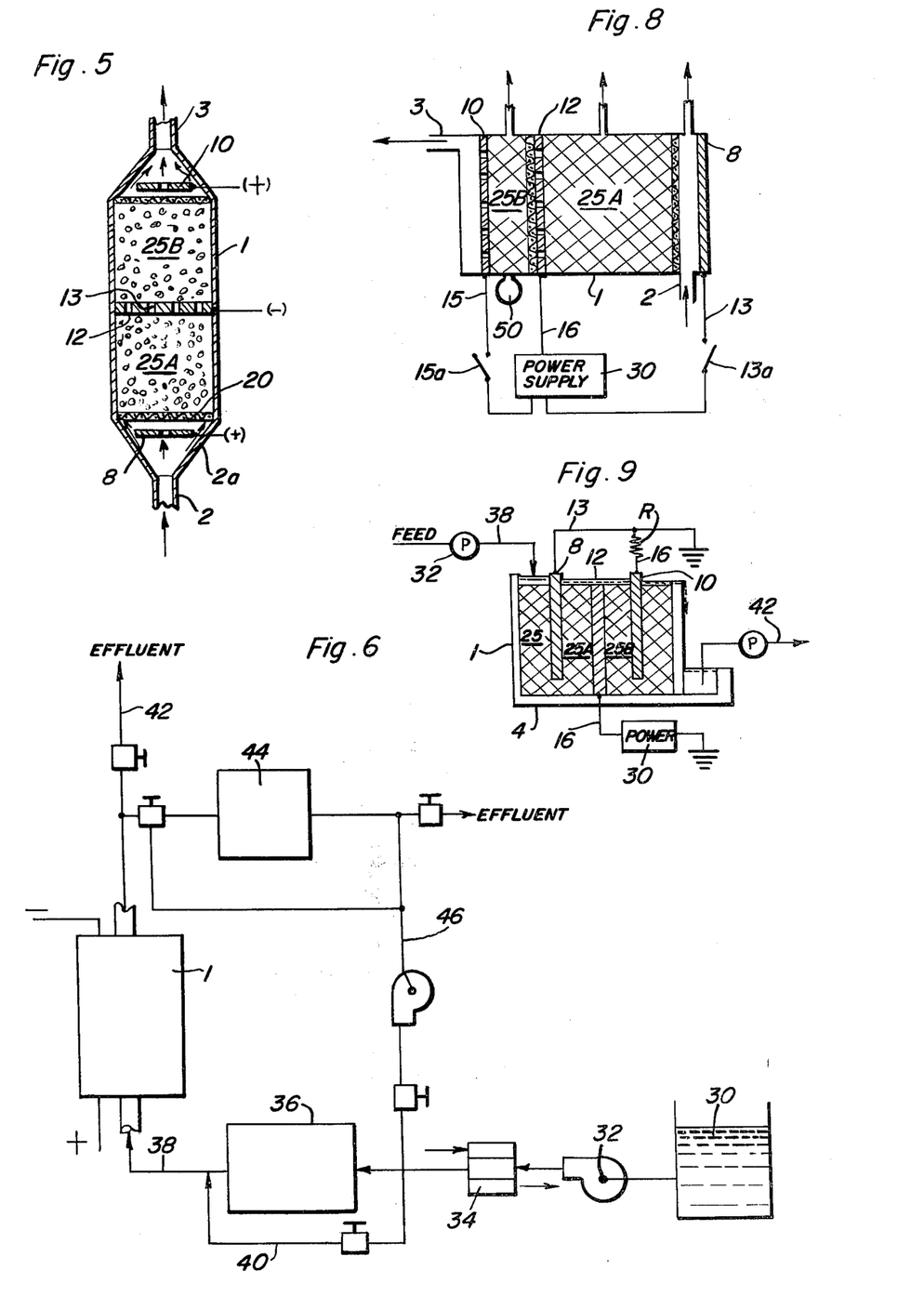
FIG. 5 is a schematic vertical cross-sectional view of a fluidized bed reactor.
FIG. 6 is a flow sheet showing the relationship of the improved process and apparatus to various conventional components of a typical industrial installation, in schematic form.
FIG. 8 is a cross-sectional view of an alternative cell having horizontal electrolyte flow and gas handling means.
FIG. 9 is a vertical cross-section view of a circuitous flow cell.

In addition to the use of multi-gradient electrochemical system in a fixed bed cell where the particles are held or restrained in a static position, it is possible to employ multiple voltage conditions in a fluidized be reactor. Shown in FIG. 5 is a vertical cross-section view of a typical two-section cell 1 having a fluid inlet 2 and conical flow distributor 2a. Electrolyte is directed upwardly through foraminous transverse electrode 8 at a velocity sufficient to maintain fluidizing conditions for a porous bed of electrically conducting particles 25A, 25B. Auxiliary electrode 12 is disposed in the fluidized bed between electrodes 8 and 10. The various operating parameters of a similar fluidized bed electrolysis cell are described in U.S. Pat. No. 3,716,459, incorporated herein by reference. In the cell embodiment of FIG. 5, a first voltage is impressed between first electrode 8 and auxiliary electrode 12 while a second voltage different from the first voltage is impressed between second electrode 10 and auxiliary electrode 12. Since the interelectrode distances 8–12 and 10–12 are equal, substantially different voltage gradients are obtained. In this cell configuration, screens 20 at bottom and top of cell 1 prevent ohmic contact with the end electrodes 8, 10. This gives a bed which is biased predominantly according to the polarity of the auxiliary electrode 12; however, different current density conditions are established in reaction zone sections 25A and 25B. The size of openings 13 in intermediate electrode 12 may be small to prevent passage of particles from bed to bed; but, this is not necessary to operation of a fluidized bed electrochemical reactor.

While the process and apparatus of this invention are particularly useful for treatment of large quantities of dilute aqueous electrolyte solutions, concentration of dissolved or suspended matter is not limiting on the use of the invention. Solutions containing less than 1ppm (part per million) solute can be treated; however, some electrochemical reactions can employ 5 percent or more solid matter. In general, the electrolyte conductivity is substantially less than that of the particulate bed material. The electrical parameters can vary widely, especially with regard to voltage gradient and current density in the cell.

The electrolyte solutions treated in the novel electrochemical cell may comprise dilute solutions of metallic ions including Cu, Au, Cr, Ni, Ag, etc. Precious metal recovery is of particular interest. In addition, it is contemplated that chemical reactions may be conducted within the cell. Typical applications include adsorption and desorption of organic compounds, oxidation of sewage and other wastes (including cyanide plating baths), synthesis of organic and inorganic compounds, reduction of hexavalent chromium ion, electrochemical precipitation and coagulation processes, condensation of slimes, oils and paints, destruction of pathogens and many other useful industrial operations.

Since the present system has multiple electrochemical capabilities, those treatments involving disparate operating conditions are especially well adapted to this invention. For instance, the serial treatment of dye stuffs and the like can be effected in an integrally contained reaction zone having alternate anodic and cathodic sections with each section having a bed material, voltage gradient, and current density adapted to the individual oxidation or reduction reactions desired. Dye-containing streams may require both electropositive and electronegative treatments to obtain the desired treatment of more than one functional group. Certain treatment involving the coagulation of suspended particles are also beneficial, particularly where an electrical charge of one polarity is transferred in a first section and the particle is the attracted and deposited electrophoretically in a second section. The cell may be utilized to concentrate an electrochemical species such as Cu, Au, Ni or other ions by alternate cathodic deposition and anodic solution of metals by reversing polarity in the sections. The operating principles of U.S. Pat. No. 3,804,733 may be employed in the concentration process.

The electrolyte may be pre-conditioned chemically or filtered to remove any foreign matter which may be deleterious to the desired electrochemical reaction. Particulate matter tends to clog the porous bed and should be removed.

The pH of the solution to be treated may vary over a wide range, being either acidic, neutral or basic. Desirably, the pH range is from 2 to 11. Depending upon the makeup of the solution which is to be treated, adjustment of the pH may be done by the addition of various acids, bases or salts to the solution. Suitable electrolytes which may be used are aqueous solutions of borates, ammonia, sodium chloride, sulfuric acid, calcium chloride, sodium cyanide, chloroacetates, sodium hydroxide, sodium bicarbonate, hydrochloric acid, phosphates and the like. Preferred electrolytes have an electrical conductivity (K) of at least about $5\times10^{-5}$ (ohm-cm)$^{-1}$.

The temperature of the electrolyte may also vary over a wide range, the only criteria being that at the temperature used the electrolyte remain a liquid. Thus, temperatures within the range of about 0° to 100°C are suitable. For economy in operation it is preferred to utilize these solutions at ambient temperatures. Similarly, the present process is desirably carried out at atmospheric pressure although either sub- or super-atmospheric pressures may be employed if desired. It has been found that temperatures at 20°–70°C may be desirable in effecting a rapid reaction depending upon the particular electrolyte, pH range, type and concentration of chemical species.

Referring now to FIG. 6, electrochemical cell 1 is shown connected to a source of electrolyte, such as tank 30. Chemical treatment of the feed solution (pH, conductivity, etc.) may take place in the tank. A pump 32 provides means for circulating electrolyte through the reaction zone of cell 1. Temperature of the electrolyte may be preconditioned to heat or cool the electrolyte with heat exchanger 34. If the electrolyte contains particulate matter for which removal is required, or if liquid/gas separation is required, a suitable separator 36 may be used for this operation in the electrolyte supply line 38 leading to the electrochemical cell 1. A bypass conduit 40 may pass electrolyte around the separator 36. Effluent from the electrochemical cell 1 may be passed through conduit 42 if no further treatment is required. A post treatment may be used where desired to remove particulate matter generated in the electrochemical cell 1. A treating unit 44, or a suitable bypass 46 may recycle electrolyte through the electrochemical cell 1.

Recycle of treated water is especially valuable in the economical recovering of metal and other ions from dilute aqueous solutions, such as plating rinse waters. Cascade rinse water systems, such as disclosed in U.S. Pat. No. 3,556,970 may be treated electrochemically with recycle of purified water to the clean rinse tank.

The effluent from the electrochemical cell may be further treated to remove organic or inorganic impurities. Contacting the treated electrolyte with activated carbon removes organic impurities such as plating brighteners which are not removed electrolytically. Ion exchange materials may be used to remove inorganic cations and anions from treated electrolyte, utilizing materials disclosed in U.S. Pat. Nos, 3,663,398 and 3,663,403, incorporated herein by reference. Also membrane processes such as ultrafiltration, dialysis or reverse osmosis may be combined with the present process.

Figure 7:
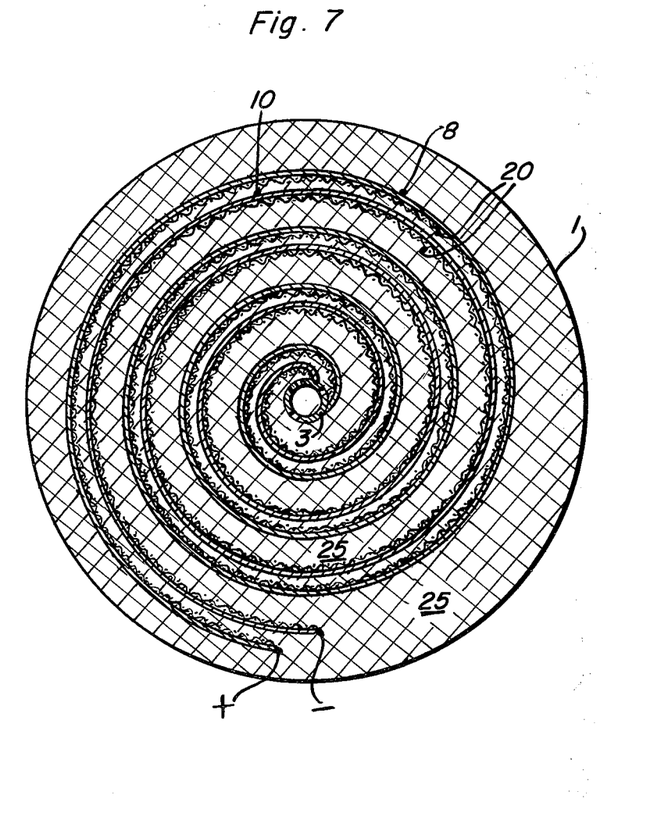
FIG. 7 is a cross-sectional schematic view of another cell embodiment having a spiral configuration.

A modification of the cell structure which permits use of only two primary electrodes is shown in schematic cross-sectional view in FIG. 7. In this spiral or toridal configuration, two or more flexible electrodes are spaced from thin layers of electrically conductive particles 25 by flexible insulating screens 20. Sheet electrodes 8 and 10 are wound in cylindrical form to provide an effective stack or alternating series of adjacent anodic and cathodic sections 25A, 25B . . . . The assembly may be wound around a central electrolyte inlet pipe 3. Where the primary electrodes 8, 10 are foraminous conductors, such as stainless steel screen, graphite cloth, perforated metal sheet, etc., electrolyte may be flowed radially as in FIG. 4.

The distances between electrodes 8 and 10 can be varied to provide different voltage gradients across alternating porous sections. For instance, the amount of particles provided can be varied on the stack array is wound around the core. A toroidal configuration is possible where the inter-electrode distances are continuously increased as the spiral shape is generated. Likewise, a fixed packing thickness (e.g., 1 cm) for a first layer and a different thickness (e.g., 2 cm) for a second layer gives a cell structure with alternating voltage gradient values. If the electrodes are unperforated sheet or metal foil, flow patterns may be axial or spiral. This modification can utilize a cylindrical pressure vessel to house the integral electrochemical cell 1. It is understood that FIG. 7 is a simplified drawing with only a few convolutions shown to explain the inventive concept. A much larger number of laminae may be used advantageously. Construction details may be obtained by according to the teachings of U.S. Pat. Nos. 2,741,595, 3,679,565 and 3,697,410.

In addition to electrochemical reactions, other simultaneous chemical reactions may be conducted employing reactants introduced to the electrolyte in the porous bed. For instance, reactive gases or liquid streams may be contacted with the electrolyte in one or more of the bed sections. Referring to FIG. 8, a cylindrical or rectangular cell 1 is shown in vertical crosssectional view with electrolyte inlet 2 and outlet 3 at opposite ends of a stacked reactor having liquid flowing horizontally between primary electrodes 8, 10 through auxiliary electrode 12. A first bed section 25A is relatively thick to obtain a low voltage gradient from power supply 30 through connectors 16 and 13, having a switch 13a for selectively energizing bed section 25A. A second relatively thin bed section 25B is likewise connected through connectors 16, 15 and switch 15a to the power supply 30. Gases may be vented from the cell at the top of the inlet and each cell section.

An optional means for introducing fluid to one of the bed section is provided. Header pipe 50 is provided with fluid connection to bed section 25B and may be operatively connected to a source of a reactant. For instance, the cell may be used to electrodeposit metal value from an aqueous metal cyanide solution (e.g. KAu(CN)$_2$), cathodically in section 25A, while concurrently introducing an ozone-containing gas into the second bed section and maintaining electrochemical oxidation in bed section 25B. The gaseous oxidation products such as $CO_2$, $N_2$, etc. are removed from the cell by venting the second bed section. This system is especially useful for treating aqueous gold cyanide solutions to recover metal value and destroy toxic cyanide in a single unit operation. One advantage of this system for metal cyanide treatment is the added oxidation capacity. It is known that gold is deposited cathodically by the reaction:

resulting in the formation of two cyanide ions per Au atom deposited. Accordingly, a net increase in cyanide ions in the first section can be destroyed in the second section, which can operate at higher current densities during oxidation to effect complete removal of cyanide.

Another use for combined treatment is the treatment of pathogen containing streams by simultaneous electrochemical and ozone reactions. A mixture of $O_3$ in a diluent gas ($N_2$, air) can be introduced to the liquid filled bed as fine bubbles containing ozone (e.g., 2–20 Vol. %).

Pathogenic microorganisms may be inactivated electrochemically according to the present invention. It is believed that electrochemical treatment of water-borne pathogens is especially useful where the microorganisms has a net negative charge and can be attracted electrophoretically to an anodic surface for reaction with nascent oxygen or ozone at the interface of the liquid electrolyte and the electrically conductive bed particles. Operating conditions for separate anodic and cathodic zones are disclosed in U.S. Pat. Nos. 3,725,226 and 3,728,245; incorporated herein by reference. For use in treating sewage, the electrolyte can be a pretreated aqueous stream from a sewage plant.

Another combined process for adding a reactant gas includes the treatment of dye-containing streams, such as effluents from dye manufacturing or fiber coloring operations. Frequently, a combined treatment is desired wherein electrochemical reduction or oxidation of organic functional groups is conducted concurrently or in immediate sequence with a gas-liquid multiphase reaction. For such systems the cell construction of FIG. 8 can be employed. A gas reactant, such as $O_3$ or $Cl_2$, can be added to the cell as described above.

Ozone treatment is also valuable in a combined treatment of cyanide plating or rinse solutions, as in the oxidation of cyanide moieties found in copper, gold or zinc solutions.

In the alternative embodiment of FIG. 9, a circuitous or cascade electrolyte flow path is effected. Pump 32 introduces electrolyte to cell 1 through conduit 38. A porous bed 25 of particles is contained in a rectangular tank 4. Electrolyte flows downwardly through the bed 25 past electrode 8, upwardly between electrodes 8 and 12 through bed section 25A, over a weir and downwardly between electrodes 10 and 12, and out of the cell over a weir to a collector reservoir, where it is recovered by effluent line 42.

A different electrical gradient between electrodes 8–12 and 10–12 is obtained by connecting a common power supply 30 to middle electrode 12 through connector 16. Direct connection of electrode 8 through connector 13 and electrode 10 through resistor R in line 16 to a common terminal of power supply 30 creates a different inter-electrode potential for the primary electrode sets. Thus, with equal electrode spacing, a different voltage gradient is obtained. This cell may be used for electrochemical oxidation and reduction reactions according to the teachings of U.S. Pat. No. 3,692,661. The circuitous path arrangement may be extended by inserting a larger number of primary electrodes in a bed of particles having low electrical conductivity.

While the invention has been shown by specific examples, there is no intent to limit the inventive concept except as set forth in the following claims.

What is claimed is:

1. In an electrochemical cell wherein an electrolyte is treated in a reaction zone containing at least one bed of electrically conductive particles, the improvement which comprises:
    a plurality of electrodes for contacting electrolyte in the reaction zone, said electrodes defining adjacent electrochemical sections in said reaction zone;
    means for biasing each of the electrodes anodically or cathodically to provide electrochemical potential between alternating electrodes;
    means for establishing different voltage gradients across adjacent sections of the reaction zone; and
    means operatively connected to said cell for circulating electrolyte through said cell in a direction substantially parallel to the voltage gradients of each section.

2. The cell of claim 1 comprising at least one foraminous insulating diaphragm disposed in the cell between anodic and cathodic electrodes.

3. The cell of claim 2 comprising at least one diaphragm means disposed closely adjacent to at least one electrode for separating the electrically conductive particles from said electrode.

4. The cell of claim 1 wherein the sections of the reaction zone are contained in an integral reaction vessel having opposite electrolyte inlet and outlet means disposed at bottom at top portions of said vessel, and wherein foraminous electrodes are mounted transverse to the direction of electrolyte flow to permit passage of electrolyte therethrough.

5. The cell of claim 4 including means for disposing foraminous electrodes to support the particles in substantially fixed position as a packed bed; and means for flowing electrolyte upwardly.

6. The cell of claim 1 wherein the electrically conductive particles consist essentially of graphite pellets having an average particle size of at least about one-half mm.

7. The cell of claim 1 including means for maintaining a first voltage gradient in a first discrete reaction section;
    means for maintaining a second voltage gradient different from said first voltage gradient in a second discrete reaction section; and
    means for insulating the bed particles from at least one major surface of each of said electrodes to prevent ohmic contact with said major surface.

8. The cell of claim 1 including means for maintaining a continuous liquid phase of electrolyte in contact with the electrodes and means for passing electrolyte through the cell serially and treating electrolyte homogeneously in each of the different voltage gradient sections of the reaction zone.

9. The cell of claim 1 wherein said sections are substantially uniform in thickness and wherein substantially different voltages are impressed across adjacent sections.

10. The cell of claim 1 wherein adjacent sections have substantially different thicknesses between electrodes, and wherein the electrodes are formed, in a spiral or toroidal configuration.

11. The cell of claim 10 including means for applying substantially equal voltages across adjacent sections.

12. The cell of claim 1 wherein the electrically conductive particles consist essentially of carbon pellets.

13. The cell of claim 1 wherein the electrically conductive particles consist essentially of Si.

14. The cell of claim 1 wherein the electrically conductive particles consist essentially of SiC.

15. The cell of claim 1 wherein the electrically conductive particles comprise elongated particles having magnetic orientation, and wherein the cell includes means for aligning said magnetic particles in a magnetic field.

16. The cell of claim 1 wherein the electrically conductive particles consist essentially of an electrochemically active metal core having a continuous coating of hydrophilic ion-permeable resin.

17. The cell of claim 1 wherein the electrically conductive particles consist essentially of carbon pellets having mercury deposited thereon.

18. An electrochemical cell comprising:
at least three primary electrodes spaced apart in alternating positions to form a plurality of separate electrochemical reaction zone sections;
means for containing electrically conductive discrete particles said reaction zone sections;
means for maintaining electrolyte in the reaction zone sections;
means for applying electrical potential between electrodes and maintaining at least two different voltage gradients in said cell.

19. The electrochemical cell of claim 18 wherein the particles comprise carbon particles having an average size of at least one-half mm.

20. The electrochemical cell of claim 18 wherein the electrically conductive particles are selected from the group consisting of metals, metal compounds, semiconductive elements and mixtures thereof.

21. The electrochemical cell of claim 18 wherein said electrodes are foraminous to permit flow of electrolyte through said electrodes and said reaction zone sections and means for flowing through both anodic and cathodic areas in said cell.

22. A stacked electrochemical cell of substantially uniform cross-sectional area comprising:
a stack of separate porous bed sections, each of said bed sections containing discrete electrically conductive particles;
primary electrodes at opposite ends of said stack;
at least one auxiliary electrode disposed between bed sections;
means for applying a first voltage gradient between one of said primary electrodes and said auxiliary electrode;
means for applying a second voltage gradient substantially different from the first gradient between another of said primary electrodes and said auxiliary electrode; and
means for flowing electrolyte through said stack in contact with said electrodes.

23. The cell of claim 22 comprising:
foraminous electrodes having means for supporting said particles and means for flowing electrolyte through said electrodes.

24. The cell of claim 22 wherein adjacent bed sections have substantially different thicknesses between electrodes and further comprising means for applying substantially equal voltage across adjacent bed sections, thereby establishing different voltage gradients.

25. The cell of claim 22 wherein adjacent cell sections are separated by a common intermediate electrode of a first polarity and wherein adjacent sections are bounded by major electrodes of a second opposite polarity.

26. The cell of claim 22 comprising:
means for directing electrolyte upwardly at a flow rate sufficient to fluidize the bed sections.

27. The cell of claim 26 comprising:
at least one foraminous insulating means for separating the electrically conductive particles from at least one primary electrode.

28. The cell of claim 27 including means for contacting the particles with the auxiliary electrode to bias the bed sections electrically.

29. The cell of claim 22 including means for introducing a gaseous reactant into at least one of the bed sections and means for venting the cell.

30. In an electrochemical process wherein an electrolyte is treated in a reaction zone containing at least one bed of electrically conductive particles, the improvement which comprises the steps of:
contacting electrolyte with a plurality of electrodes in the reaction zone, said electrodes defining discrete adjacent electrochemical sections in said reaction zone;
biasing each of said electrodes anodically or cathodically to provide electrochemical potential between alternating electrodes;
establishing different voltage gradients across adjacent sections of the reaction zone; and
circulating electrolyte through said sections serially in a flow path through at least one intermediate foraminous electrode.

31. The process of claim 30 wherein at least one foraminous insulating diaphragm is disposed in the reaction zone between anodic and cathodic electrodes.

32. The process of claim 30 wherein at least one diaphragm is located in contact with at least one electrode to separate the electrically conductive particles from the electrode, wherein the sections of the reaction zone are contained in a integral reaction vessel having electrolyte inlet and outlet disposed at bottom at top portions of said vessel, and wherein foraminous electrodes are mounted transverse to the direction of electrolyte flow to permit passage of electrolyte therethrough.

33. The process of claim 30 which includes providing planar foraminous electrodes to support the particles in substantially fixed position as a packed bed; and continuously flowing electrolyte upwardly through said foraminous electrodes.

34. The process of claim 30 comprising the step of electrolyzing a dilute aqueous solution containing metal ions to deposit said metal cathodically.

35. The process of claim 30 including the step of contacting electrolyte with ion exchange material.

36. The process of claim 30 including the step of contacting the electrochemically treated electrolyte with activated carbon to remove impurities non-electrolytically.

37. The process of claim 30 wherein the electrolyte contains metal cyanide and including the step of depositing said metal cathodically in a first electrochemical section.

38. The process of claim 37 including the step of oxidizing cyanide ion in a second section down stream from the first section.

39. The process of claim 38 including the step of contacting cyanide ion with an ozone containing gas in said second section.

40. The process of claim 30 including the step of contacting electrolyte with a reactant gas introduced to at least one of said sections.

41. The process of claim 30 wherein the electrolyte contains a dye having organic functional group.

42. The process of claim 30 wherein the electrolyte contains an amalgam-forming metal and wherein the electrically conductive particles have mercury deposited thereon and including the step of forming an amalgam simultaneously with electrodeposition.

43. The process of claim 30 wherein pathogenic microorganisms in the electrolyte are treated with an ozone containing gas in an anodic section.

44. The process of claim 30 including the step of contacting the electrolyte said section zone with a mixture of ozone and a diluent gas.

45. The process of claim 30 wherein the electrolyte contains water-borne pathogenic microorganisms which are inactivated by electrochemical treatment.

46. The process of claim 30 including the step of fluidizing the electrically conducting particles in the reaction zone by flowing electrolyte upwardly at sufficient velocity to maintain an expanded particle bed.

47. The process of claim 41 including the step of biasing the fluidized particles by contact with an intermediate electrode.

48. In an electrochemical process wherein a porous bed of electrically conductive particles is maintained in a reaction zone between first and second electrodes electrolyte is passed through the bed parallel to electrical current, the improvement which comprises the steps of:
providing at least one foraminous auxiliary electrode disposed in the porous bed transverse to the direction of flow to provide continuous ionically-conducting fluid paths; and
maintaining substantially different voltage gradients between said auxiliary electrode and said first and second electrodes, whereby homogeneous treatment of the electrolyte is obtained.

* * * * *

UNITED STATES PATENT AND TRADEMARK OFFICE
CERTIFICATE OF CORRECTION

PATENT NO. : 3,915,822
DATED : October 28, 1975
INVENTOR(S) : Preston Leonard Veltman It is certified that error appears in the above-identified patent and that said Letters Patent are hereby corrected as shown below:

Claim 4, column 12, line 25, after "bottom" insert --and--.

Claim 18, column 13, line 18, after "particles" insert --in--.

Claim 32, column 14, line 36, change "a" to --an--; line 37, after "bottom" insert --and--.

Claim 44, column 15, line 12, change "said section" to --in said reaction--.

Claim 48, column 16, line 7, after "electrodes" insert --,--.

Signed and Sealed this

Thirty-first Day of August 1976

[SEAL]

Attest:

RUTH C. MASON
*Attesting Officer*

C. MARSHALL DANN
*Commissioner of Patents and Trademarks*